United States Patent
Inbe et al.

(10) Patent No.: US 8,287,662 B2
(45) Date of Patent: Oct. 16, 2012

(54) COMPOSITION FOR METAL SURFACE TREATMENT, METAL SURFACE TREATMENT METHOD AND METAL MATERIAL

(75) Inventors: Toshio Inbe, Tokyo (JP); Thomas Kolberg, Heppenheim (DE)

(73) Assignees: Nippon Paint Co., Ltd., Osaka (JP); Chemetall GmbH, Frankfurt am Main (DE)

(*) Notice: Subject to any disclaimer, the term of this patent is extended or adjusted under 35 U.S.C. 154(b) by 988 days.

(21) Appl. No.: 12/224,635

(22) PCT Filed: Feb. 28, 2007

(86) PCT No.: PCT/JP2007/053831
§ 371 (c)(1),
(2), (4) Date: Dec. 1, 2008

(87) PCT Pub. No.: WO2007/100017
PCT Pub. Date: Sep. 7, 2007

(65) Prior Publication Data
US 2009/0239093 A1 Sep. 24, 2009

(30) Foreign Application Priority Data
Mar. 1, 2006 (JP) .................................. 2006-054860

(51) Int. Cl.
*C22C 22/48* (2006.01)
(52) U.S. Cl. ........ 148/247; 148/274; 148/277; 148/279; 148/284; 106/14.05; 106/14.11
(58) Field of Classification Search .................. 148/247, 148/274, 279, 277, 284; 106/14.05, 14.11
See application file for complete search history.

(56) References Cited

U.S. PATENT DOCUMENTS

| 7,029,522 B2 | 4/2006 | Matsui et al. |
| 7,510,612 B2 | 3/2009 | Matsukawa et al. |
| 2003/0213533 A1* | 11/2003 | Sako et al. ..................... 148/243 |
| 2004/0163735 A1* | 8/2004 | Matsukawa et al. .......... 148/247 |
| 2005/0205165 A1* | 9/2005 | Akui et al. ..................... 148/247 |

FOREIGN PATENT DOCUMENTS

| CN | 1510167 | 7/2004 |
| CN | 1530461 | 9/2004 |
| EP | 1433887 | 6/2004 |
| JP | 57-158397 | 9/1982 |
| JP | 7-310189 | 11/1995 |
| JP | 10-204649 | 8/1998 |
| JP | 2004-218071 | 8/2004 |
| JP | 2004-218074 | 8/2004 |
| JP | 2005-325401 | 11/2005 |
| WO | 2004032594 | 4/2004 |

OTHER PUBLICATIONS

Notice of Reasons for Rejection issued to CN Application No. 200780007366.X, mailed Jun. 18, 2010.
Supplemental European Search Report issued to EP Application No. 07737550.9, mailed Mar. 31, 2010.

* cited by examiner

*Primary Examiner* — Lois Zheng
(74) *Attorney, Agent, or Firm* — Dilworth & Barrese, LLP

(57) ABSTRACT

A composition for metal surface treatment can form a chemical conversion coating film which achieves sufficient foundation surface concealment, coating adhesion and corrosion resistance. A method for treating the surface of a metal material with such a composition for metal surface treatment is used. Specifically a metal surface treatment composition used for a treatment of a metal surface, contains a zirconium compound and/or a titanium compound, and a polyamine compound having a number average molecular weight of not less than 150 but not more than 500,000. The polyamine compound contains not less than 0.1 millimole but not more than 17 millimoles of a primary and/or secondary amino group per 1 g of the solid content, and the content of the zirconium compound and/or titanium compound in the metal surface treatment composition is not less than 10 ppm but not more than 10,000 ppm in terms of metal elements. The mass ratio of the zirconium element and/or titanium element contained in the zirconium compound and/or titanium compound relative to the polyamine compound is not less than 0.1 but not more than 100.

17 Claims, No Drawings

COMPOSITION FOR METAL SURFACE TREATMENT, METAL SURFACE TREATMENT METHOD AND METAL MATERIAL

TECHNICAL FIELD

The present invention relates to a metal surface treatment composition for use in metal surface treatment, a metal surface treatment method for treating the surface of a metal material using the surface treatment composition, and a metal material treated with the metal surface treatment method.

BACKGROUND ART

When an article to be processed is to be coated, it is commonly subjected to surface treatment from the viewpoint of ensuring the corrosion resistance and adhesiveness of a coating film. In particular, when a metal (metal material, metal structure) is to be coated, the metal surface is subjected to chemical conversion treatment (surface treatment) for chemically forming a chemical conversion coating film.

An example of the chemical conversion treatment is chromate conversion treatment with a chromate containing composition; however, adverse effects of chromium have been noted. In recent years, treatment with zinc phosphate treatment agents (zinc phosphate treatment), which are chromium-free treatment agents (surface treatment agents, chemical conversion treatment agents) has become widespread (see, for example, Patent Document 1).

However, the zinc phosphate treatment agent is highly reactive due to the high content of metal ions and acids that it contains, hence this treatment agent offers an unfavorable impact on both the cost and the workability during drainage treatment. In addition, metal surface treatment with the zinc phosphate treatment agent involves the generation and sedimentation of water-insoluble salts. Such precipitates are generally referred to as sludge, and the removal and disposal of sludge generates an additional undesirable cost. Furthermore, the use of phosphate ions is not preferable because they may affect the environment through eutrophication, and the treatment of phosphate ion effluent requires considerable labor. Moreover, metal surface treatment with the zinc phosphate treatment agent requires surface adjustment, which can prolong the total treatment process.

In addition to the zinc phosphate treatment agent and chromate conversion treatment agent, a chemical conversion treatment agent containing a zirconium compound is known (see, for example, Patent Document 2). The chemical conversion treatment agent including a zirconium compound is a treatment agent with concentrations of metal ions and acids which are not as high, and hence its reactivity is also not as high. This offers a favorable cost advantage and improved workability during drainage treatment. Such a chemical conversion treatment agent is also superior to the above-described zinc phosphate treatment agent in regard to the inhibition of sludge generation.

However, a chemical conversion coating film formed with a treatment agent including a zirconium compound cannot be said to have good adhesiveness to a coating film obtained by cationic electro-deposition or the like. Therefore, the treatment agent, including a zirconium compound, has been combined with phosphate ions or other components in order to improve its adhesive properties and corrosion resistance. However, the combination of phosphate ions can cause the above-described eutrophication.

Further, an increase in the coating film adhesiveness by addition of a water soluble resin component has been attempted (for example, refer to Patent Document 3). In patent Document 3, a chemical conversion treatment agent which is a metal surface treatment composition including the following constitution is disclosed. Namely, this chemical conversion treatment agent is a chemical conversion treatment agent including a water soluble resin, the water soluble resin having at least the constituent units shown by the following Formulas (1), (2).

Based on this chemical conversion treatment agent, with zirconium as a film forming component of the chemical conversion film, and fluorine as an etching agent for the metal material, their respective actions can respectively improve the corrosion resistance and adhesiveness of the metal material. Further, a water soluble resin having an amino group, specifically a polyvinylamine resin and a polyallylamine resin, by acting on not only the surface of the metal material, but also on the coating film formed after the chemical conversion treatment, can improve the adhesion between the surface of the metal material and the coating film.

Patent Document 1: Japanese Unexamined Patent Application Publication No. H10-204649
Patent Document 2: Japanese Unexamined Patent Application Publication No. H7-310189
Patent Document 3: Japanese Unexamined Patent Application Publication No. 2004-218074

DISCLOSURE OF THE INVENTION

Problems to be Solved by the Invention

However, in the chemical conversion treatment agent disclosed in Patent Document 3, if the amino group of the water soluble resin is present in excess in the chemical conversion treatment agent, water molecules will be attracted by the excess amino groups. These attracted water molecules will generate blisters where the coating film is lifted, deteriorating the base metal concealing properties along with the coating film adhesiveness and the corrosion resistance.

The present invention has been made in view of the above-described problems, and an objective thereof is to provide: a metal surface treatment composition capable of forming a chemical conversion coating film which can offer sufficient base metal concealing properties, coating film adhesiveness, and corrosion resistance; a metal surface treatment method for carrying out surface treatment of a metal material using this metal surface treatment composition; and a metal material treated with this metal surface treatment method.

Means for Solving the Problems

The present inventors have carried out diligent research in order to solve the above problem. As a result, they have discovered that the above problem can be solved by specifying the content of primary and/or secondary amino groups of a polyamine compound in a metal surface treatment composition containing a zirconium compound and/or titanium compound, and a polyamine compound, and thus arrived at and completed the present invention. More specifically, the invention provides the following.

The first aspect of the present invention is a metal surface treatment composition used for surface treatment of a metal, containing a zirconium compound and/or titanium compound, and a polyamine compound having a number average molecular weight from 150 to 500,000; wherein said polyamine compound has from 0.1 mmol to 17 mmol of primary and/or secondary amino group per 1 g of solid content, and the content of said zirconium compound and/or titanium compound in said metal surface treatment composition is from 10 ppm to 10,000 ppm with respect to the metal element, and a mass ratio of zirconium element and/or titanium element included in said zirconium compound or titanium compound, with respect to said polyamine compound, is from 0.1 to 100.

The second aspect of the present invention is a metal surface treatment composition according to the first aspect, wherein said polyamine compound is a product produced by a reaction between a primary and/or secondary amino group-containing compound, and an amine activity reducing compound having a functional group A which has reactivity with said primary or secondary amino group.

The third aspect of the present invention is a metal surface treatment composition according to the second aspect, wherein said product is produced by reacting from 1 mmol to 60 mmol of said functional group A with respect to 100 mmol or said primary and/or secondary amino group.

The fourth aspect of the present invention is a metal surface treatment composition according to the second or third aspect, wherein said functional group A is at least one kind selected from the group consisting of a glycidyl group, isocyanate group, aldehyde group, and an acid anhydride group.

The fifth aspect of the present invention is a metal surface treatment composition used for surface treatment of a metal, containing a zirconium compound and/or titanium compound, and a polyamine compound having a number average molecular weight from 150 to 500,000, wherein said polyamine compound is a product produced by interaction between a primary and/or secondary amino group-containing compound, and an amine activity reducing compound B containing at least one functional group B which interacts with said primary and/or secondary amino group and reduces the amine activity, and a content of said zirconium compound and/or titanium compound in said metal surface treatment composition is from 10 ppm to 10,000 ppm with respect to the metal element, and the mass ratio of zirconium element and/or titanium element included in said zirconium compound and/or titanium compound, with respect to said polyamine compound, is 0.1 to 100.

The sixth aspect of the present invention is a metal surface treatment composition according to the fifth aspect, wherein said product is produced by interaction of from 1 mmol to 60 mmol of said functional group B with respect to 100 mmol of said primary and/or secondary amino group.

The seventh aspect of the present invention is a metal surface treatment composition according to the fifth or sixth aspect, wherein said functional group B is at least one kind selected from the group consisting of a carboxyl group, sulphonic group, phosphate group, silanol group, and a phosphorous group.

The eighth aspect of the present invention is a metal surface treatment composition according to any one of the first to seventh aspects, wherein said polyamine compound is a compound having at least one kind of constituent unit shown by the following Formula (1), Formula (2), and Formula (3).

(in Formula (3), $R_1$ is an alkylene group having a carbon number of 1 to 6, $R_2$ is a substituent group shown by the Formula (4) to Formula (6) below, and $R_3$ is —OH, —OR$_4$, or —R$_5$ ($R_4$ and $R_5$ represent alkyl groups having a carbon number of 1 to 6.))

(In Formula (6), $R_6$ is a hydrogen atom, aminoalkyl group having a carbon number of 1 to 6, or alkyl group having a carbon number of 1 to 6, and $R_7$ is a hydrogen atom or an aminoalkyl group having a carbon number of 1 to 6.)

The ninth aspect of the invention is a metal surface treatment composition according to any one of the first to eighth aspects, wherein the metal surface treatment composition has a pH from 1.5 to 6.5.

The tenth aspect of the present invention is a metal surface treatment composition according to any one of the first to ninth aspects, further including a fluorine compound, wherein the content of a free fluorine element in the metal surface treatment composition is from 0.01 ppm to 100 ppm.

The eleventh aspect of the present invention is a metal surface treatment composition according to any one of the first to tenth aspects, further including at least one oxidizing agent selected from the group consisting of nitric acid, nitrous acid, sulfuric acid, sulfurous acid, persulfuric acid, phosphoric acid, carboxylic acid group-containing compound, sulfonic acid group-containing compound, hydrochloric acid, bromic acid, chloric acid, hydrogen peroxide, $HMnO_4$, $HVO_3$, $H_2WO_4$, $H_2MoO_4$, and salts thereof.

The twelfth aspect of the present invention is a metal surface treatment composition according to any one of the first to eleventh aspects, further including at least one metal element selected from the group consisting of magnesium, zinc, calcium, aluminum, gallium, indium, copper, iron, manganese, nickel, cobalt, cerium, strontium, rare earth elements, and silver.

The thirteenth aspect of the present invention is a metal surface treatment composition according to any one of the first to twelfth aspects, further including at least one kind selected from the group consisting of nonionic surfactants, anionic surfactants, cationic surfactants, and ampholytic surfactants.

The fourteenth aspect of the present invention is a metal surface treatment method for treating the surface of a metal material, comprising: a treatment solution contact step of contacting a metal surface treatment solution containing the metal surface treatment composition according to any one of the first to thirteenth aspects of the present invention with said metal material; and a water washing step of washing the metal material which has been subjected to the treatment solution contact step, with water.

The fifteenth aspect of the present invention is a metal surface treatment method according to the fourteenth aspect, wherein said metal material is simultaneously subjected to a degreasing treatment during said treatment solution contact step.

The sixteenth aspect of the present invention is a metal surface treatment method according to the fourteenth or fifteenth aspect, wherein said metal material is electrolyzed as a cathode in said treatment solution contact step.

The seventeenth aspect of the present invention is a metal surface treatment method according to any one of the fourteenth to sixteenth aspects, further comprising an acid contact step of contacting the metal material which has been subjected to said water washing step, with an acidic aqueous solution containing at least one selected from the group consisting of cobalt, nickel, tin, copper, titanium, and zirconium.

The eighteenth aspect of the present invention is a metal surface treatment method according to any one of the fourteenth to seventeenth aspects, including a polymer-containing solution contact step of contacting the metal material which has been subjected to said water washing step, with a polymer-containing solution containing at least one of a water-soluble polymer compound and a water-dispersible polymer compound.

The nineteenth aspect, of the present invention is a metal material treated with the metal surface treatment method according to any one of the fourteenth to eighteenth aspects.

The twentieth aspect of the present invention is a metal material according to the nineteenth aspect having a surface treatment coating layer on an iron-based metal material surface, wherein said surface treatment coating layer contains at least 10 mg/m$^2$ of zirconium element and/or titanium element, and a mass ratio of zirconium element and/or titanium element with respect to nitrogen element by XPS analysis of said surface treatment coating layer is from 0.05 to 500.

The twenty-first aspect of the present invention is a metal material according to the nineteenth aspect having a surface treatment coating layer on a zinc-based metal material surface, wherein said surface treatment coating layer contains at least 10 mg/m$^2$ of zirconium element and/or titanium element, and a mass ratio of zirconium element and/or titanium element, with respect to nitrogen element by XPS analysis of said surface treatment coating layer is 0.05 to 500.

The twenty-second aspect of the present invention is a metal material according to the nineteenth aspect having a surface treatment coating layer on an aluminum-based metal material surface, wherein said surface treatment coating layer contains at least 5 mg/m$^2$ of zirconium element and/or titanium element, and the mass ratio of zirconium element and/or titanium element with respect to nitrogen element by XPS analysis of said surface treatment coating layer is 0.05 to 500.

The twenty-third aspect of the present invention is a metal material according to the nineteenth aspect having a surface treatment coating layer on a magnesium-based metal material surface, wherein said surface treatment coating layer, on its outermost surface, contains at least 5 mg/m$^2$ of zirconium element and/or titanium element, and the mass ratio of zirconium element and/or titanium element with respect to nitrogen element by XPS analysis of said surface treatment coating layer is 0.05 to 500.

Effects of the Invention

According to the present invention, it is possible to provide a metal surface treatment composition which can form a chemical conversion coating film having sufficient base metal concealing properties, coating film adhesiveness, and corrosion resistance, with a metal surface treatment composition containing a zirconium compound and/or titanium compound, and a polyamine compound having an amino group, wherein said polyamine compound has a number average molecular weight from 150 to 500,000, and further has from 0.1 mmol to 17 mmol of primary and/or secondary amino group per 1 g of solid content, and the content of said zirconium compound and/or titanium compound in said metal surface treatment composition is from 10 ppm to 10,000 ppm, with respect to the metal element, and the mass ratio of zirconium element and/or titanium element included in said zirconium compound or titanium compound, with respect to said polyamine compound, is 0.1 to 100. Further, it is possible to provide a metal surface treatment method whereby a surface treatment of a metal material is carried out using this metal surface treatment composition, and a metal material which has been treated according to this metal surface treatment method.

PREFERRED MODE FOR CARRYING OUT THE INVENTION

An embodiment of the invention is described in detail below.

Metal Surface Treatment Composition

A metal surface treatment composition according to the present embodiment is used for metal surface treatment, and includes a zirconium compound and/or titanium compound, and a polyamine compound.

Further, the metal surface treatment composition according to the present embodiment is diluted with water, and adjusted to make a metal surface treatment solution, which is used for metal surface treatment.

Zirconium Compound and/or Titanium Compound Component

Zirconium and/or titanium derived from the zirconium compound and/or titanium compound component contained in the metal surface treatment composition is a component for forming a chemical conversion coating film. The formation of a chemical conversion coating film including zirconium and/or titanium on a metal material allows the improvement of corrosion resistance and abrasion resistance of the metal material.

When a metal material is subjected to surface treatment with the metal surface treatment composition including zirconium and/or titanium according to the present embodiment, a dissolution reaction of the metal constituting the metal material occurs. Upon the occurrence of the metal dissolution reaction, in the presence of zirconium fluoride and/or titanium fluoride, hydroxides or oxides of zirconium and titanium are generated by the extraction of fluorine from $ZrF_6^{2-}$ and $TiF_6^{2-}$, respectively, by metal ions eluted into the metal surface treatment composition, and the increase of pH at the interface. Subsequently, hydroxides or oxides of zirconium and/or titanium are thought to deposit on the surface of the metal material. The metal surface treatment composition according to the present embodiment is a reactive chemical conversion treatment agent, and hence, it can be used for immersion treatment of a metal material of complicated shape. Further, chemical reaction produces a chemical conversion coating film firmly attached to a metal material, which may be subjected to water washing after the chemical conversion treatment.

The zirconium compound is not particularly limited, and examples thereof include alkali metal fluorozirconates such as $K_2ZrF_6$, fluorozirconates such as $(NH_4)_2ZrF_6$, soluble fluorozirconates such as $H_2ZrF_6$, zirconium fluoride, zirconium oxide, zirconyl nitrate, and zirconium carbonate and the like.

The titanium compound is not particularly limited, and examples thereof include alkali metal fluorotitanates, fluorotitanates such as $(NH_4)_2TiF_6$, soluble fluorotitanates like fluorotitanic acids such as $H_2TiF_6$, titanium fluoride, titanium oxide and the like.

Content of Zirconium and/or Titanium

The content of zirconium and/or titanium in the metal surface treatment composition according to the present embodiment is preferably within the range from 10 ppm to 10000 ppm with respect to the metal element. If the content is less than 10 ppm, a sufficient amount of coating cannot be provided on a metal material, and if it is more than 10000 ppm, no further improvement is expected and cost efficiency decreases. The content is more preferably from 50 ppm to 1000 ppm with respect to the metal element.

Free Fluorine Component

In the metal surface treatment composition according to the present embodiment, it is possible to further include a fluorine compound.

The fluorine element included in the metal surface treatment composition according to the present embodiment plays the role of an etching agent of the metal material, and a complexing agent of the zirconium and/or titanium. The source of the fluorine element is not particularly limited, and for example, fluoride compounds such as hydrofluoric acid, ammonium fluoride, fluoroboric acid, ammonium hydrogen fluoride, sodium fluoride, and sodium hydrogen fluoride can be mentioned. Further, is it also possible to use complex fluorides as the source, for example, hexafluorosilicate, and specifically, (hydro)silicofluoric acid, zinc (hydro)silicofluoric acid, manganese (hydro)silicofluoric acid, magnesium (hydro)silicofluoric acid, nickel (hydro)silicofluoric acid, iron (hydro)silicofluoric acid, and calcium (hydro)silicofluoric acid can be mentioned.

Content of Free Fluorine Component

The content of the free fluorine element in the metal surface treatment composition according to the present embodiment is from 0.01 ppm to 100 ppm. Herein, "content of free fluorine element" means the concentration of the fluorine ion in a free state in the treatment solution, as obtained by measurement of the treatment solution with a meter having a fluorine ion electrode. If the content of free fluorine element in the metal surface treatment composition is less than 0.01 ppm, the solution becomes unstable and precipitation may occur, and further the etching strength is reduced, and coating film formation does not sufficiently occur. On the other hand, if it exceeds 100 ppm, the etching is excessive, and zirconium coating film formation does not occur. This content of free flourine element in the metal surface treatment composition is more preferably from 0.1 ppm to 20 ppm.

Polyamine Compound

The polyamine compound included in the metal surface treatment composition according to the present embodiment is a polymer compound having a plurality of amino groups per molecule. This polyamine compound having amino groups acts upon both the chemical conversion coating film and the subsequently formed coating film, and can increase the adhesiveness of both.

Molecular Weight of Polyamine Compound

The polyamine compound has a number average molecular weight within the range from 150 to 500,000. If less than 150, it is not possible to obtain a chemical conversion coating film having sufficient coating film adhesiveness, which is not preferable. If over 500,000, there is concern that coating film formation will be inhibited. The above lower limit is more preferably 5,000, and the above upper limit is more preferably 70,000.

Structural Formula of the Amino Group-Containing Compound

As one example of the polyamine compound, the polyamine compound having the structure below can be mentioned. Namely, this polyamine compound is a compound having one kind of the constituent units shown by the following formulas (1), (2) and (3) below in at least one portion thereof.

(1)

(2)

(3)

(In Formula (3), $R_1$ is an alkylene group having a carbon number of 1 to 6, $R_2$ is a substituent group shown by the formulas (4) to (6) below, and $R_3$ is —OH, —$OR_4$, or —$R_5$ ($R_4$ and $R_5$ are alkyl groups having a carbon number of 1 to 6).)

(4)

(5)

(6)

(In formula (6), $R_6$ is a hydrogen atom, aminoalkyl group having a carbon number of 1 to 6, or an alkyl group having a carbon number of 1 to 6, $R_7$ is a hydrogen atom, or an aminoalkyl group having a carbon number of 1 to 6.)

It is particularly preferable if the polyamine compound is a polyvinylamine resin consisting only of the constituent units shown by the above Formula (1), a polyallylamine resin consisting only of the constituent units shown by the above Formula (2), and a polysiloxane consisting only of the constituent units shown by the above Formula (3). As one example of the polysiloxane, N-(2-aminoethyl)-3-aminopropylmethyldimethoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, hydrochlorides of N-(vinylbenzyl)-2-aminoethyl-3-aminopropyltrimethoxysilane, and the like can be mentioned. The above polyvinylamine resin, polyallylamine resin, and polysiloxane are particularly preferable in the point of having an excellent effect of improving the adhesiveness.

The above polyvinylamine resin is not particularly limited, and for example it is possible to use commercially available polyvinylamine resins such as PVAM-0595B (manufactured by Mitsubishi Chemical Corporation) and the like. The above polyallylamine resin is not particularly limited, and for example it is possible to use commercially available polyallylamine resins such as PAA-01, PAA-10C, PAA-H-10C, PAA-D041HCI (all manufactured by NittoBoseki Co., Ltd.) and the like. The above polyaminosiloxane is not particularly limited, and it is possible to use commercially available polysiloxanes. Further, is it possible to use in combination two or more of the polyvinylamine resin, polyallylamine resin, and polysiloxane.

The above polyamine compound has a primary and/or secondary amino group. In the metal surface treatment composition of the present embodiment, it is necessary to appropriately control the active hydrogen of the primary and/or secondary amino group included in the above polyamine compound, specifically, the primary or secondary amino group (below referred to as the amine activity). If the primary and/or secondary amino groups of the polyamine compound are few, it is not possible to obtain adhesiveness, and conversely, if there are more than necessary, the excess primary and/or secondary amino groups will exert adverse effects, and as a result of the generation of blisters, the base metal concealing properties, along with the adhesiveness and the corrosion resistance will be degraded.

First Means for Appropriately Controlling the Amine Activity

The first means for appropriately controlling the amine activity of the polyamine compound is to control the primary and/or secondary amino groups of the polyamine compound to from 0.1 mmol to 17 mmol per 1 g of the solid content. More preferably, it is controlled to from 3 mmol to 15 mmol per 1 g of the solid content.

However, if the mole number of the primary and/or secondary amino group per 1 g of the resin solid content is less than 0.1 mmol, adhesiveness to the subsequently formed coating film is not obtained, and if the mole number of the primary and/or secondary amino group per 1 g of the resin solid content exceeds 17 mmol, the excess amino groups will exert adverse effects, and as a result of the generation of blisters, the base metal concealing properties, along with the adhesiveness and the corrosion resistance will be degraded.

Among the polyamine compounds, for example, the amine value (as the number of mmol of the primary and/or secondary amino groups per 1 g of the resin solid content) of a polyvinylamine resin which is a compound consisting only of the constituent units shown by the above Formula (1) is 23.3, and the amine value of a polyallylamine resin which is a compound consisting only of constituent units shown by the above Formula (2) is 17.5, and because all of the above resins contain primary and/or secondary amino groups exceeding 17 mmol per 1 g of the resin solid content, it is necessary to control the primary and/or secondary amino groups so that they do not exceed 17 mmol per 1 g of solid content. Further, is it possible to measure the above amine value according to the American Society for Testing and Materials (ASTM D 2073 and ASTM D 2074).

In contrast, if the polyamine composition is a polysiloxane consisting only of the constituent units shown by the above Formula (3), 17 mmol per 1 g of the solid content is not exceeded.

From the above, in order to control the primary and/or secondary amino groups to "from 0.1 mmol to 17 mmol per 1 g of the solid content", the polyamine compound is preferably a compound (a product) produced by a reaction of a compound containing primary and/or secondary amino groups (below referred to as a primary and/or secondary amino group-containing compound), and an amine activity reducing compound having a functional group A which is reactive with said primary and/or secondary amino group. Namely, it is desirable to control the primary and/or secondary amino group to not exceed 17 mmol per 1 g of the solid content by making the primary and/or secondary amino groups react with other functional groups, or by copolymerizing vinylamine and allylamine with another vinyl group-containing compound or allyl group-containing compound.

Reaction Ratio

Further, the above product is preferably produced by reacting from 1 mmol to 60 mmol of functional group A with respect to 100 mmol of the primary and/or secondary amino groups. If less than 1 mmol, the excess amino groups will exert an adverse effect, and as a result of the generation of blisters, the base metal concealing properties, along with the adhesiveness and the corrosion resistance will be degraded. If exceeding 60 mmol, the adhesiveness to the subsequently formed coating film cannot be obtained. The above product is more preferably produced by reacting from 1 mmol to 30 mmol of functional group A with respect to 100 mmol of primary and/or secondary amino groups.

Functional Group A

The functional group A which has reactivity with the primary and/or secondary amino group is not particularly limited, and for example, glycidyl groups, isocyanate groups, aldehyde groups, acid anhydride groups, and the like can be mentioned.

Here, for example, if the primary and/or secondary amino group-containing compound is polyallylamine, and the functional group A is isocyanate, then the polyamine compound produced by reaction of the polyallylamine and the amine activity reducing compound A having isocyanate groups has 17 mmol or less of primary and/or secondary amino groups per 1 g of solid content. Accordingly, the result of qualitative measurements of the metal surface treatment composition according to the present embodiment, for the case that the above polyamine compound is detected, the polyamine compound is presumed to have 17 mmol or less of the primary and/or secondary amino group per 1 g of solid content.

Second Means for Appropriately Controlling the Amine Activity

Further, the second means for appropriately controlling the amine activity of the polyamine compound is to make the polyamine compound a product produced by the interaction of a primary and/or secondary amino group-containing compound, and an amine activity reducing compound B containing as least one functional group B which interacts with a primary and/or secondary amino group and reduces the amine activity. Namely, the amine activity of the polyamine compound is appropriately controlled by interaction of the primary and/or secondary amino groups and another functional group B. In the present invention, "interaction of the primary and/or secondary amino groups and another functional group B" refers to an interaction deriving from ionic bonding forces, hydrogen bonding forces, dipole-dipole interaction forces, and van der Waals forces between the primary and/or secondary amino group and the other functional group B, and is an interaction which can form a chemical conversion coating film having sufficient base metal concealing properties, coating film adhesiveness, and corrosion resistance.

Interaction Ratio

Further, the product produced by the interaction of the primary and/or secondary amino group-containing compound and the amine activity reducing compound B having a functional group B is preferably produced by interacting from 1 mmol to 60 mmol of functional group B with respect to 100 mmol of the primary and/or secondary amino group. If less than 1 mmol, the excess amino groups will exert an adverse effect, and as a result of the generation of blisters, the base metal concealing properties, along with the adhesiveness and the corrosion resistance will be degraded. If more than 60 mmol, it is not possible to obtain adhesiveness to the subsequently formed coating film. The above product is more preferably produced by the interaction of from 1 mmol to 30 mmol of the functional group B with respect to 100 mmol of the primary and/or secondary amino group.

Functional Group B

The functional group B interacting with the primary and/or secondary amino group is not particularly limited, and for example, carboxyl group, sulphonic group, phosphate group, silanol group, and phosphorous group can be mentioned.

As examples of a compound having at least one of the above functional group A and the above functional group B, 3-isocyanatepropyl-triethoxysilane, colloidal silica, epoxy resin, acetic anhydride, polyphosphoric acid and the like can be mentioned, but it is not limited to these examples. Further, it is possible to use as-is the commercially available KBE9007 (manufactured by Shin-Etsu Chemical Co., Ltd.), and XS1003 (manufactured by Chisso Corporation) and the like.

Mass Ratio of Zirconium Element and/or Titanium Element with Respect to the Polyamine Compound The mass ratio of the zirconium element and/or titanium element in the zirconium compound and/or titanium compound with respect to the polyamine compound is from 0.1 to 100. If less than 0.1, it is not possible to obtain corrosion resistance and adhesiveness. If more than 100, cracks will readily occur in the surface treatment coating layer, and it is difficult to obtain a uniform coating layer. Preferably, the above mass ratio is from 0.5 to 20.

pH of Metal Surface Treatment Composition

The metal surface treatment composition used in the present embodiment preferably has a pH from 1.5 to 6.5. When the pH is less than 1.5, excessive etching may make sufficient film formation impossible, and an uneven film may be formed that adversely affects the appearance of the coating film. On the other hand, if the pH is higher than 6.5, etching is insufficient to form a favorable coating film. The pH is preferably from 2.0 to 5.0, and more preferably in the range from 2.5 to 4.5.

The pH of the metal surface treatment composition may be appropriately adjusted with an acidic compound such as nitric acid and sulfuric acid, and a basic compound such as sodium hydrate, potassium hydroxide, and ammonia.

Surfactant

Further, the metal surface treatment composition according to the present embodiment may include at least one kind of surfactant selected from the group consisting of a nonionic surfactant, anionic surfactant, cationic surfactant, and amphoteric surfactant. The nonionic surfactants, anionic surfactants, cationic surfactants, and amphoteric surfactants may be known ones. In the case where the metal surface treatment composition used in the present embodiment includes the above surfactants, a favorable film is formed with no necessity for degreasing and cleansing of the metal material in advance.

Metal Element

The metal surface treatment composition according to the present embodiment may include a metal element which is capable of imparting adhesiveness and corrosion resistance to the coating film. Examples of the metal element which may be contained in the metal surface treatment composition as a chemical conversion treatment agent include magnesium, zinc, calcium, aluminum, gallium, indium, copper, iron, manganese, nickel, cobalt, cerium, strontium, rare earth elements, and silver.

Oxidizing Agent

The metal surface treatment composition according to the present embodiment may further include an oxidizing agent for promoting the film formation reaction. Examples of the oxidizing agent which may be contained in the metal surface treatment composition include nitric acid, nitrous acid, sulfuric acid, sulfurous acid, persulfuric acid, phosphoric acid, carboxylic acid group-containing compounds, sulfonate group-containing compounds, hydrochloric acid, bromic acid, chloric acid, hydrogen peroxide, $HMnO_4$, $HVO_3$, $H_2WO_4$, and $H_2MoO_4$, and salts of these oxygen acids.

Metal Surface Treatment Method

The metal surface treatment method for carrying out surface treatment of a metal according to the present embodiment is not particularly limited, and can be carried out by contacting a metal surface treatment solution including the metal surface treatment composition according to the present embodiment with a metal material. More specifically, the metal surface treatment method according to the present embodiment includes a treatment solution contact step of contacting a metal surface treatment solution containing the metal surface treatment composition with a metal material. Examples of the above metal surface treatment method include an immersion method, spray method, roll coat method, and flow coating.

Surface Treatment Conditions

The treatment temperature in the surface treatment is preferably within the range of 20° C. to 70° C. If less than 20° C., there is a possibility that sufficient coating film formation does not occur, and further there are disadvantages, such that, in the summertime, temperature adjustment is necessary, and if above 70° C., there is no particular effect, and it is economically disadvantageous. This treatment temperature is more preferably within the range from 30° C. to 50° C.

The treatment time for the surface treatment is preferably within the range from 5 seconds to 1100 seconds. If less than 5 seconds, there is the disadvantage that a sufficient coating film amount cannot be obtained, and there is no meaning for a time over 1100 seconds, because there is no effect from further increasing the coating film amount. The treatment time is more preferably within the range from 30 seconds to 120 seconds.

The metal surface treatment method according to the present embodiment, in contrast with the conventional chemical conversion treatment method with a zinc phosphate chemical conversion treatment agent, does not require surface adjustment treatment in advance. This allows chemical conversion treatment of a metal material with fewer processes.

Further, in the metal surface treatment method according to the present embodiment, a metal material may be electrolyzed as a cathode. In this case, hydrogen is reduced at the interface of the metal material, which is the cathode, to increase the pH. With the increase of pH, stability of the compound containing the zirconium and/or titanium element decreases at the interface of the cathode, by which a surface treatment film deposits as an oxide or hydroxide containing water.

Metal Material

The metal material for use in the metal surface treatment method according to the present embodiment is not particularly limited, and examples thereof include a steel sheet and aluminum sheet. Steel sheet is not particularly limited and includes cold-rolled steel, hot-rolled steel, mild steel, or high tensile steel, and also include iron-based base materials (iron-based metal materials), aluminum-based base materials (aluminum-based metal materials), zinc-based base materials (zinc-based metal materials), and magnesium-based base materials (magnesium-based metal materials). Iron-based base materials refer to base materials (metal materials) including iron and/or iron alloy, aluminum-based base materials refer to base materials (metal materials) including aluminum and/or aluminum alloy, and zinc-based base materials refer to base materials (metal materials) including zinc and/or zinc alloy. Magnesium-based base materials refer to base materials (metal materials) including magnesium and/or magnesium alloy.

Furthermore, the metal surface treatment method according to the present embodiment may be simultaneously applied to a metal material including a plurality of metal base materials, such as iron-based base materials, aluminum-based base materials, and zinc-based base materials. Automobile bodies and automobile parts are constituted of various metal materials such as iron, zinc, aluminum and the like, but according to the metal surface treatment method according to the present embodiment, a satisfactory surface treatment can be carried out with a single treatment even for such automobile bodies and automobile body parts.

Iron-based base materials used as a metal material according to the present embodiment are not particularly limited, and examples thereof include cold-rolled steel and hot-rolled steel. The aluminum-based base materials are also not particularly limited, and examples thereof include 5000 series aluminum alloy, 6000 series aluminum alloy, and aluminum-coated steel plates treated by aluminum-based electroplating, hot dipping, or vapor deposition plating. Zinc-based base materials are also not particularly limited, and examples thereof include zinc or zinc-based alloy coated steel plates treated by zinc-based electroplating, hot dipping, or vapor deposition plating, such as zinc coated steel plate, zinc-nickel coated steel plate, zinc-iron coated steel plate, zinc-chromium coated steel plate, zinc-aluminum coated steel plate, zinc-titanium coated steel plate, zinc-magnesium coated steel plate, and zinc-manganese coated steel plate. High tensile steel plates are available in various grades depending on strength and manufacturing process, and examples thereof include JSC440J, 440P, 440W, 590R, 590T, 590Y, 780T, 780Y, 980Y, and 1180Y.

Amount of Surface Treatment Film

In order to increase the corrosion resistance of iron-based metal materials such as cold-rolled steel sheets, hot-rolled steel sheets, cast iron, sintered materials, and the like, and to form a uniform surface treatment coating film, and to obtain satisfactory adhesiveness, if the surface treatment coating layer formed on an iron-based metal material surface contains at least 10 mg/m$^2$ or more of zirconium element or titanium element, it is preferable that the mass ratio of the zirconium element and/or titanium element with respect to the nitrogen element as analyzed by XPS of the surface treatment coating layer is 0.05 to 500.

Further, in order to increase the corrosion resistance of zinc-based metal materials such as zinc or galvanized steel sheets, alloy hot dip galvanized steel sheets and the like, and to form a uniform chemical conversion coating film, and to obtain a satisfactory adhesiveness, if the surface treatment coating layer formed on a zinc-based metal material surface contains at least 10 mg/m$^2$ or more of zirconium element or titanium element, it is preferable that the zirconium element and/or titanium element mass ratio with respect to the nitrogen element as analyzed by XPS of the surface treatment coating layer is 0.05 to 500.

Further, in order to increase the corrosion resistance of aluminum-based metal materials such as cast aluminum, aluminum alloy sheets and the like, to form a uniform chemical conversion coating film, and to obtain a satisfactory adhesiveness, if the surface treatment coating layer formed on an aluminum-based metal material surface contains at least 5 mg/m$^2$ or more of zirconium element or titanium element, it is preferable that the zirconium element and/or titanium element mass ratio with respect to the nitrogen element as analyzed by XPS of the surface treatment coating layer is 0.05 to 500.

Further, in order to increase the corrosion resistance of magnesium-based metal materials such as magnesium alloy sheets, cast magnesium and the like, and to form a uniform chemical conversion coating film, and to obtain a satisfactory adhesiveness, if the surface treatment coating layer formed on a magnesium-based metal material surface contains at least 5 mg/m$^2$ or more of zirconium element or titanium element, it is preferable that the zirconium element and/or titanium element mass ratio with respect to the nitrogen element as analyzed by XPS of the surface treatment coating layer is 0.05 to 500.

For any of the metal materials, there is no particular upper limit for the amount of the surface treatment coating layer, but if the amount is excessive, the surface treatment coating layer tends to cause cracking, which makes difficult the operation of forming a uniform coating film. Accordingly, the amount of the surface treatment film formed by the metal surface treatment method of the present embodiment preferably is 1 g/m$^2$ or less, more preferably 800 mg/m$^2$ or less of zirconium and/or titanium with respect to the metal element.

Pretreatment of Metal Material

The metal material according to the present embodiment is preferably a metal material which has been cleansed by degreasing treatment. After the degreasing treatment, the metal material of the present embodiment is preferably subjected to water washing treatment. The degreasing treatment and water washing treatment are conducted for removing oil and stains from the surface of the metal material. In usual cases, immersion treatment is conducted for several minutes at a temperature from 30° C. to 55° C. using a degreasing agent such as a phosphate-free and nitrogen-free degreasing detergent. If desired, preliminary degreasing treatment may be conducted before the degreasing treatment. Furthermore, for removing the degreasing agent, water washing treatment is conducted after the degreasing treatment at least once by spray treatment with a large amount of washing water.

As described above, in the case where the metal surface treatment composition includes the surfactant, a favorable film is formed with no necessity of degreasing and cleansing of the metal material in advance. More specifically, in such a case, degreasing treatment of the metal material is simultaneously achieved in the treatment solution contact step.

Aftertreatment of Metal Material

A metal material having formed thereon a chemical conversion coating film by the metal surface treatment method according to the present embodiment is preferably subjected to water washing treatment before the subsequent formation of a coating film. More specifically, the metal surface treatment method according to the present embodiment includes a treatment solution contact step of contacting a metal surface treatment solution containing the metal surface treatment composition with the metal material, and a water washing step of washing the metal material with water after the treatment solution contact step. Impurities on the surface of the chemical conversion coating film are removed by the water washing treatment before the formation of a coating film, which further improves the adhesiveness to a coating film to offer favorable corrosion resistance.

The chemical conversion coating film formed by the metal surface treatment method according to the present embodiment can be subjected to a water washing treatment before the coating film formation because a polyamine compound which is a polymer is incorporated. Namely, in the case of monomer amine compounds, there is concern that they will be removed by the water washing treatment, whereas for a polyamine compound which is a polymer, there is a strong interaction with hydroxides or oxides of zirconium and/or titanium which form the chemical conversion coating film, thus there is no such concern. Accordingly, the chemical conversion coating film formed by the metal surface treatment method according to the present embodiment will not lose its adhesiveness by water washing treatment.

In the water washing treatment after the surface treatment, the final water washing is preferably conducted with pure water. The water washing treatment after the surface treatment may be spray water washing, immersion water washing, or a combination thereof.

Following the water washing treatment after the surface treatment, drying may be conducted as necessary in accordance with a known method, but in the case where a chemical conversion coating film is formed by the metal surface treatment method according to the present embodiment, the film may be coated after water washing treatment with no necessity for drying treatment. More specifically, the formation of a chemical conversion coating film by the metal surface treatment method according to the present embodiment could be followed by coating by a wet and wet coating method. Accordingly, the metal surface treatment method according to the present embodiment allows for the reduction of the surface treatment process for metal materials before electro-deposition coating, such as an automobile body, body shell of a two-wheel vehicle or the like, various parts, and the like before electro-deposition coating.

Subsequently Formed Coating Film

Following the formation of a chemical conversion coating film by the metal surface treatment method according to the present embodiment, a coating film is formed on the chemical conversion coating film, and examples thereof include coating films formed by conventionally known paints such as an electro-deposition paint, solvent paint, aqueous paint, and powder paint.

Among these paints, electro-deposition paint, particularly cationic electro-deposition paint, is preferable for forming a coating film. The reason is that the cationic electro-deposition paint usually includes a resin having a functional group which exhibits reactivity or compatibility with amino groups, and hence, it acts on the polyamine compound having amino groups contained in the metal surface treatment composition as a chemical conversion treatment agent to further improve the adhesiveness between the electro-deposition coating film and the chemical conversion coating film. The cationic electro-deposition paint is not particularly limited, and examples thereof include known cationic electro-deposition paints such as an aminated epoxy resin, aminated acrylic resin, and sulfonated epoxy resin.

Following the water washing step of washing the metal material with water after the treatment solution contact step of contacting the metal surface treatment solution containing the metal surface treatment composition according to the present embodiment, or following electrolytic treatment by contact, the metal material may be contacted with an acidic aqueous solution containing at least one selected from the group consisting of cobalt, nickel, tin, copper, titanium, and zirconium. More specifically, the metal surface treatment method according to the present embodiment may include, following the water washing step of washing with water the metal material after the treatment solution contact step, an acid contact step of contacting the metal material with an acidic aqueous solution containing at least one selected from the group consisting of cobalt, nickel, tin, copper, titanium, and zirconium. This further improves the corrosion resistance.

The supply source of at least one metal element selected from the group consisting of cobalt, nickel, tin, copper, titanium and zirconium is not particularly limited. Preferable examples thereof include oxides, hydroxides, chlorides, nitrates, oxynitrates, sulfates, oxysulfates, carbonates, oxycarbonates, phosphates, oxyphosphates, oxalates, oxyoxalates, and organic metal compounds of the metal elements which are readily available.

The acidic aqueous solution containing the metal elements preferably has a pH of 2 to 6. The pH of the acidic aqueous solution may be adjusted with an acid such as phosphoric acid, nitric acid, sulfuric acid, hydrofluoric acid, hydrochloric acid, and organic acid, and alkali such as sodium hydroxide, potassium hydroxide, lithium hydroxide, alkali metal salt, ammonia, ammonium salt, and amine.

Following the water washing step of washing the metal material with water after the treatment solution contact step of contacting the metal surface treatment solution containing the metal surface treatment composition according to the present embodiment with the metal material, or following electrolytic treatment by contact, the metal material may be contacted with a polymer-containing solution which contains at least one of a water-soluble polymer compound and water-dispersible polymer compound. More specifically, the metal surface treatment method according to the present embodiment may include, following the water washing step of washing with water the metal material after the treatment solution contact step, a polymer-containing solution contact step of contacting the metal material with a polymer-containing solution which contains at least one of a water-soluble polymer compound and water-dispersible polymer compound. This further improves corrosion resistance.

The water-soluble polymer compound and water-dispersible polymer compound are not particularly limited, and examples thereof include polyvinyl alcohol, poly(meth)acrylic acid, copolymer of acrylic acid and methacrylic acid, copolymers of ethylene and acrylic monomer such as (meth)acrylic acid and (meth)acrylate, copolymer of ethylene and vinyl acetate, polyurethane, aminomodified phenolic resin, polyester resin, epoxy resin, tannin, tannic acid and its salts, and phytic acid.

EXAMPLES

The invention is further illustrated by the following Examples and Comparative Examples, but the invention should not be limited to them. The blending quantity represents parts by mass unless otherwise noted.

Example 1

A commercial cold-rolled steel sheet (SPC, Manufactured by Nippon Testpanel Co., Ltd., 70 mm×150 mm×0.8 mm) was prepared as a metal material.
Pretreatment of Metal Material before Chemical Conversion Treatment
(Degreasing Treatment)
Specifically, the metal material was subjected to degreasing treatment at 40° C. for two minutes using "SURFCLEANER EC92" (product name, manufactured by Nippon Paint Co., Ltd.) as an alkali degreasing treatment agent.
(Water Washing Treatment after Degreasing Treatment)
Following the degreasing treatment, the metal material was subjected to immersion washing in a water-washing bath, followed by spray washing with tap water for about 30 seconds.
Chemical Conversion Treatment
Before the surface treatment (chemical conversion treatment) of the metal material, a metal surface treatment composition was prepared. Specifically, as a polyamine compound having a primary and/or secondary amino group, "PAA10C" (polyallylamine, effective concentration 10%, manufactured by NittoBoseki Co., Ltd.) at 1 mass %, and as a compound having a functional group A and/or functional group B, "KBM403" (3-glycidoxypropyl-trimethoxysilane, effective concentration 100%, manufactured by Shin-Etsu Chemical Co., Ltd.) were reacted at a mass ratio of 1:0.5, at a reaction temperature of 25° C., and reaction time of 60 min to obtain a PAA-epoxy reactant (1:0.5). Next, using the above PAA-epoxy reactant (1:0.5), and as a zirconium, a zircon hydrofluoric acid (reagent), a metal surface treatment composition was prepared so that the zirconium concentration was 200 ppm, and the PAA-epoxy reactant (1:0.5) concentration was 200 ppm. This metal surface treatment composition was adjusted to pH 3.5 with a sodium hydroxide aqueous solution, to prepare a metal surface treatment solution. The temperature of the metal surface treatment solution was adjusted to 30° C., and then a metal material which had been subjected to a water washing treatment was immersion treated for 60 sec.

Further, the amount of primary and/or secondary amino groups (the mol number of the primary and/or secondary amino groups per 1 g of solid content of the polyamine compound) of the above PAA-epoxide reactant (1:0.5) was determined according to the following Equation (1). The results are shown in Table 1. Further, in the following Examples and Comparative Examples, when the calculation of the amount of primary and/or secondary amino groups according to c was possible, the results are shown in Table 1 and Table 2. In the following Examples and Comparative Examples, as a substitute for amine values determined by measurement, the amine group amount determined by calculation is used.

$$\text{amine group amount} = (mX - nY)/(m+n) \quad \text{Equation (1)}$$

(In the above equation, m:n is the solid content mass ratio of the polyamine compound and the compound having the functional group A and/or the functional group B; Y is the mmol number of the functional group A and/or the functional group B per 1 g of the compound having the functional group A and/or functional group B; and X is the mmol number of the primary and/or secondary amino groups included per 1 g of the polyamine compound in the case that the above compound having functional group A and/or functional group B is not included in the metal surface treatment composition.)

For example, in the case of the PAA-epoxy reactant (1:0.5) of Example 1, the amine equivalent of the PAA10C is 57, and the primary and/or secondary amino group amount per 1 g of the PAA10C is $(1/57) \times 1000 = 17.5$ (mmol/g). Further, the epoxy equivalent amount of KBM403 is 236, and the epoxy group amount per 1 g of KBM403 is $(1/236) \times 1000 = 4.2$ (mmol/g). The PAA-epoxy reactant (1:0.5) is a condensate where PAA10C and KBM403 were reacted in a mass ratio of 1:0.5, and thus, the amine group amount of the PAA-epoxy reactant (1:0.5), according to the above Equation (1), where m=1, n=0.5, X=17.5, Y=4.2, is calculated as $(1 \times 17.5 - 0.5 \times 4.2)/(1+0.5) = 10.3$.
Water Washing Treatment after Chemical Conversion Treatment
The metal material after the chemical conversion treatment was subjected to spray treatment with tap water for 30 seconds. Then, it was subjected to spray treatment with ion-exchanged water for ten seconds
Drying Treatment
The metal material after the water washing treatment was dried in an electric drying oven at 80° C. for five minutes. The amount of the chemical conversion coating film (mg/m²) was determined by measuring the content of Zr, Si, and C contained in the metal surface treatment composition using an "XRF1700" (X-ray fluorescence spectrometer manufactured by Shimadzu Corporation). Further, using an x-ray photo-electron spectrometer (XPS, product name: ESCA3200, manufactured by Shimadzu Corporation), surface analysis of the obtained test sheet was carried out, and the mass ratio of the zirconium element with respect to the nitrogen element of the coating film surface was determined. Specifically, the above mass ratio was determined from the peak intensity ratio of the 1s orbital of the nitrogen element and the 3d orbital of the zirconium element. The result is shown in Table 1.
Electro-Deposition Coating
After the chemical conversion treatment and water washing treatment, the metal materials in a wet condition were each coated with "ELECTRODEPOSITION POWERNIX 110" (product name, manufactured by Nippon Paint Co., Ltd.), a cationic electro-deposition paint, to form an electro-deposition coating film. The dry film thickness after the electro-deposition coating was 20 μm. Subsequently, each metal material was washed with water, and baked at 170° C. for 20 minutes to obtain test plates.

Example 2

A test sheet was obtained by the same means as in Example 1, except that the metal surface treatment composition was prepared so that the concentration of the above PAA-epoxy reactant (1:0.5) was not 200 ppm, but 50 ppm.

Example 3

A test sheet was obtained by the same means as in Example 1, except that the metal surface treatment composition was prepared so that the above PAA-epoxy reactant (1:0.5) was replaced with a product (PAA-DENACOL EX322 reactant) where the above PAA10C at 1 mass %, and DENACOL EX211 (epoxy, manufactured by Nagase ChemteX Corporation) were reacted in a mass ratio of 1:1.

Example 4

A test sheet was obtained by the same means as in Example 1, except that the metal surface treatment composition was prepared so that the above PAA-epoxy reactant (1:0.5) was replaced with a product (PAA-KBE9007 reactant) where the above PAA10C at 1 mass %, and KBE9007 (3-isocyanatepropyl-triethoxysilane, effective concentration 100%, manufactured by Shin-Etsu Chemical Co., Ltd.) were reacted in a mass ratio of 1:1, at a reaction temperature of 25° C., and reaction time of 15 minutes.

Example 5

A test sheet was obtained by the same means as in Example 1, except that the metal surface treatment composition was prepared so that the above PAA-epoxy reactant (1:0.5) was replaced with a product (PAA-acetic anhydride reactant) where the above PAA10C at 1 mass %, and acetic anhydride (reagent) were reacted in a mass ratio of 1:0.5, at a reaction temperature of 25° C., and reaction time of 60 minutes.

Example 6

A test sheet was obtained by the same means as in Example 1, except that instead of the above PAA-epoxy reactant, the above PAA10C and further, SNOWTEX N (colloidal silica, manufactured by Nissan Chemical Industries, Ltd.), were added to the metal surface treatment composition and the metal surface treatment composition was prepared so that the concentration of the PAA10C was 200 ppm, and the concentration of the colloidal silica was 200 ppm.

Example 7

A test sheet was obtained by the same means as in Example 1, except that the metal surface treatment composition was prepared so that the above PAA-epoxy reactant (1:0.5) was replaced with a product (low molecular PAA-epoxy reactant) where PAA-3 (low molecular polyallylamine, effective concentration 15%, manufactured by NittoBoseki Co., Ltd.) at 1 mass %, and the above KBM403 were reacted in a mass ratio of 1:0.5.

Example 8

A test sheet was obtained by the same means as in Example 1, except that the metal surface treatment composition was prepared so that the above PAA-epoxy reactant (1:0.5) was replaced with PAA-1112 (allylamine-dimethylallylamine copolymer, non-volatile content 15 mass %, manufactured by NittoBoseki Co., Ltd.).

Example 9

Fifteen parts by mass of KBE903 (3-aminopropyl-triethoxysilane, effective concentration 100%, manufactured by Shin-Etsu Chemical Co., Ltd.), and 15 parts by mass of KBM603 (N-2(aminoethyl)-3-aminopropyl-trimethoxysilane, effective concentration 100%, manufactured by Shin-Etsu Chemical Co., Ltd.) were uniformly dropped over 60 minutes from a dropping funnel into a solvent of 70 parts by mass of deionized water (solvent temperature: 25° C.), and a reaction was carried out for 24 hours at 25° C. under a nitrogen atmosphere, to obtain a 30% active ingredient condensate of organosilane (below referred to as KBE603-KBM903 cocondensate). A test sheet was obtained by the same means as in Example 1, except that the metal surface treatment composition was prepared so that the above PAA-epoxy reactant (1:0.5) was replaced with this KBE603-KBM903 cocondensate.

Example 10

A test sheet was obtained by the same means as in Example 1, except that the metal surface treatment composition was prepared so that nitric acid (reagent) was further added to the metal surface treatment composition, such that the nitric acid concentration was 200 ppm.

Example 11

A test sheet was obtained by the same means as in Example 1, except that the metal surface treatment composition was prepared so that aluminum nitrate (reagent) and hydrogen fluoride (reagent) were further added to the metal surface treatment composition, and the aluminum nitrate concentration was 500 ppm, and the hydrogen fluoride concentration was 1000 ppm.

Example 12

A test sheet was obtained by the same means as in Example 1, except that the metal surface treatment composition was prepared so that RESITOP PL4012 (phenolic resin, manufactured by Gun Ei Chemical Industry Co., Ltd.) was further added to the metal surface treatment composition, and the phenolic resin concentration was 200 ppm.

Example 13

A test sheet was obtained by the same means as in Example 1, except that the metal surface treatment composition was prepared so that the above PAA-epoxy reactant (1:0.5) was replaced with a product (PVA-epoxy reactant) where PVAM-0595B (polyvinylamine, effective concentration 11%, manufactured by Dia-Nitrix Co., Ltd.) at 1 mass %, and the above KBM403 were reacted in a mass ratio of 1:0.5.

Example 14

A test sheet was obtained by the same means as in Example 1, except that the metal surface treatment composition was prepared so that the above PAA-epoxy reactant (1:0.5) had a concentration of not 200 ppm, but 50 ppm, and ADEKATOL LB-83 (surfactant, manufactured by Asahi Denka Co., Ltd.) was further added to the metal surface treatment composition, and the concentration of the surfactant was 200 ppm.

Example 15

A test sheet was obtained by the same means as in Example 1, except that the metal surface treatment composition was prepared so that the above PAA-epoxy reactant (1:0.5) had a concentration of not 200 ppm, but 50 ppm, and cerium nitrate (reagent) was further added to the metal surface treatment composition, and the concentration of the cerium nitrate was 10 ppm.

Example 16

A test sheet was obtained in the same manner as Example 1 except that a high tensile steel sheet (70 mm×150 mm×0.8 mm) was used as the metal material in place of the SPC.

Comparative Example 1

A test sheet was obtained by the same means as in Example 1, except that the metal surface treatment composition was prepared without adding the above PAA-epoxy reactant (1:0.5) to the metal surface treatment composition.

Comparative Example 2

A test sheet was obtained by the same means as in Example 1, except that the metal surface treatment composition was prepared so that the above PAA-epoxy reactant (1:0.5) produced in Example 1 was not added, and magnesium nitrate (reagent) was added such that the concentration of the magnesium nitrate was 200 ppm.

Comparative Example 3

A test sheet was obtained by the same means as in Example 1, except that the metal surface treatment composition was prepared so that the above PAA-epoxy reactant (1:0.5) produced in Example 1 was not added, and sodium nitrite (reagent) was added such that the concentration of the sodium nitrite was 2000 ppm.

Comparative Example 4

A test sheet was obtained by the same means as in Example 1, except that the metal surface treatment composition was prepared so that the above PAA-epoxy reactant (1:0.5) produced in Example 1 was not added, and KBM903 (3-aminopropyl-triethoxysilane, effective concentration 100%, manufactured by Shin-Etsu Chemical Co., Ltd.), was added such that the concentration of the KBE903 was 200 ppm.

Comparative Example 5

A test sheet was obtained by the same means as in Example 1, except that the metal surface treatment composition was prepared so that the above PAA-epoxy reactant (1:0.5) produced in Example 1 was not added, and RESITOP PL4012 (aminomodified phenolic resin, manufactured by Gun Ei Chemical Industry Co., Ltd.), was added such that the concentration of the RESITOP PL4012 was 200 ppm.

Comparative Example 6

A test sheet was obtained by the same means as in Example 1, except that the metal surface treatment composition was prepared so that instead of the above PAA-epoxy reactant (1:0.5), the above PAA10C was added to the metal surface treatment composition such that the concentration of the PAA10C was 200 ppm.

Comparative Example 7

A test sheet was obtained by carrying out the same operations as in Example 1, except that the chemical conversion treatment was changed to zinc phosphate treatment as shown below.

Zinc Phosphate Treatment

The above SPC was used as a metal material, and the metal material after the degreasing treatment and water washing treatment was subjected to surface adjustment by immersion in 0.3% SURFFINE GL1 (surface adjusting agent manufactured by Nippon Paint Co., Ltd.) for 30 seconds at room temperature. Subsequently, the material was immersed in SURFDINE SD-6350 (zinc phosphate chemical conversion treatment agent manufactured by Nippon Paint Co., Ltd.) at 42° C. for two minutes.

Comparative Example 8

A test sheet was obtained by the same means as in Comparative Example 7, except that as the metal material, the above high-tensile steel sheet (70 mm×150 mm×0.8 mm) replaced the above SPC.

Tests

Secondary Adhesiveness Test (SDT)

Two longitudinally parallel cuts reaching the base metal were made in the steel plates obtained in the Examples and Comparative Examples, and these were immersed in a 5 mass % NaCl solution at 50° C. for 480 hours. Next, after washing with water and drying, adhesive tape ("L-Pack LP-24" (product name) manufactured by Nichiban Co., Ltd.) was adhered to the cut portions, and further the tape was abruptly detached. The maximum width of the paint adhered to the detached adhesive tape was measured. The results are shown in Table 1 and Table 2.

TABLE 1

| | Metal Material | Zr (ppm) | pH | Polyamine (ppm) | Polyamine/Zr |
|---|---|---|---|---|---|
| Example 1 | SPC | 200 | 3.5 | PAA-epoxy reactant (200) | 1 |
| Example 2 | SPC | 200 | 3.5 | PAA-epoxy reactant (50) | 0.25 |
| Example 3 | SPC | 200 | 3.5 | PAA-DENACOL EX211 reactant (200) | 1 |
| Example 4 | SPC | 200 | 3.5 | PAA-KBE9007 reactant (200) | 1 |
| Example 5 | SPC | 200 | 3.5 | PAA-acetic anhydride reactant (200) | 1 |
| Example 6 | SPC | 200 | 3.5 | PAA (200) | 1 |
| Example 7 | SPC | 200 | 3.5 | low molecular PAA-epoxy reactant (200) | 1 |
| Example 8 | SPC | 200 | 3.5 | allylamine, diallylamine cocondensate (200) | 1 |
| Example 9 | SPC | 200 | 3.5 | KBM603/KBE903 cocondensate (200) | 1 |
| Example 10 | SPC | 200 | 3.5 | PAA-epoxy reactant (200) | 1 |
| Example 11 | SPC | 200 | 3.5 | PAA-epoxy reactant (200) | 1 |
| Example 12 | SPC | 200 | 3.5 | PAA-epoxy reactant (200) | 1 |
| Example 13 | SPC | 200 | 3.5 | PAA-epoxy reactant (200) | 1 |
| Example 14 | SPC | 200 | 3.5 | PAA-epoxy reactant (50) | 0.25 |
| Example 15 | SPC | 200 | 3.5 | PAA-epoxy reactant (50) | 0.25 |
| Example 16 | high-tensile | 200 | 3.5 | PAA-epoxy reactant (200) | 1 |

TABLE 1-continued steel sheet

| | Reaction Conditions (additive mass ratio) | Other Additives (ppm) | Treatment Time (sec) | Notes |
|---|---|---|---|---|
| Example 1 | 1% 25° C. × 60 min (1:0.5) | — | 60 | — |
| Example 2 | 1% 25° C. × 60 min (1:0.5) | — | 60 | amine amount adjusted |
| Example 3 | 1% 25° C. × 60 min (1:1) | — | 60 | amine value adjusted |
| Example 4 | 1% 25° C. × 60 min (1:1) | — | 60 | reaction with isocyanate |
| Example 5 | 1% 25° C. × 60 min (1:0.5) | — | 60 | partially acylated PAA |
| Example 6 | — | colloidal silica (200) | 60 | ion bonding with silica |
| Example 7 | 1% 25° C. × 60 min (1:0.5) | — | 60 | low molecular PAA |
| Example 8 | — | — | 60 | amine value reduced at time of synthesis |
| Example 9 | 30% 25° C. × 24 h (1:1) (solvent:water) | — | 60 | polyamine from aminosilane |
| Example 10 | 1% 25° C. × 60 min (1:0.5) | nitric acid (3000) | 60 | oxidizing agent added |
| Example 11 | 1% 25° C. × 60 min (1:0.5) | Al nitrate (500) HF (1000) | 60 | metal ion added |
| Example 12 | 1% 25° C. × 60 min (1:0.5) | phenolic resin (200) | 60 | adhesive resin added |
| Example 13 | 1% 25° C. × 60 min (1:0.5) | — | 60 | polyvinylamine |
| Example 14 | 1% 25° C. × 60 min (1:0.5) | surfactant (200) | 60 | amine amount adjusted |
| Example 15 | 1% 25° C. × 60 min (1:0.5) | cerium nitrate (10) | 60 | amine amount adjusted |
| Example 16 | 1% 25° C. × 60 min (1:0.5) | — | 60 | high-tensile steel sheet |

| | Sludge External Appearance | Amine Group Amount (mmol/g) | Amount of SPC Coating Film (mg/m$^2$) Zr | Si | C | N/Zr mass ratio | SDT Detached Width (mm) Surface | Edge | CCT (mm) |
|---|---|---|---|---|---|---|---|---|---|
| Example 1 | a | 10.3 | 60 | — | 8.5 | 5.2 | none | none | 6.7 |
| Example 2 | a | 10.3 | 82 | — | 9.6 | not measured | none | none | 7.2 |
| Example 3 | a | 5.2 | 50 | — | 7.4 | not measured | none | none | 7.3 |
| Example 4 | a | 6.8 | 55 | — | 8.2 | not measured | none | none | 6.9 |
| Example 5 | a | 5.1 | 65 | — | 7.2 | not measured | none | none | 6.9 |
| Example 6 | b | 17.5 | 69 | 1.1 | 10.0 | not measured | none | 0.4 | 7.3 |
| Example 7 | a | 10.3 | 55 | 0.3 | 19.0 | not measured | 0.6 | 1.2 | 7.5 |
| Example 8 | a | 7.8 | 62 | — | 8.8 | not measured | none | none | 6.9 |
| Example 9 | a | 10.9 | 51 | 9.7 | 10.1 | not measured | none | none | 7.3 |
| Example 10 | a | below 10.3 | 66 | — | 9.1 | not measured | none | none | 7.5 |
| Example 11 | a | below 10.3 | 66 | — | 9.1 | not measured | none | none | 6.9 |
| Example 12 | a | below 10.3 | 52 | — | 7.5 | not measured | none | none | 7.2 |
| Example 13 | a | 14.1 | 58 | — | 10.2 | not measured | 0.8 | 2.4 | 7.2 |
| Example 14 | a | below 10.3 | 77 | — | 9.2 | not measured | none | none | 7.5 |
| Example 15 | a | below 10.3 | 72 | — | 9.1 | not measured | none | none | 6.6 |
| Example 16 | a | 10.3 | 81 | — | 9.9 | not measured | 0.6 | 0.6 | 7.2 |

TABLE 2

| | Metal Material | Zr (ppm) | pH | Polyamine (ppm) | Polyamine/Zr |
|---|---|---|---|---|---|
| Comparative Example 1 | SPC | 200 | 3.5 | — | — |
| Comparative Example 2 | SPC | 200 | 3.5 | — | — |
| Comparative Example 3 | SPC | 200 | 3.5 | — | — |

TABLE 2-continued

| | | | | | |
|---|---|---|---|---|---|
| Comparative Example 4 | SPC | 200 | 3.5 | — | — |
| Comparative Example 5 | SPC | 200 | 3.5 | — | — |
| Comparative Example 6 | SPC | 200 | 3.5 | PAA10C (200) | 1 |
| Comparative Example 7 | SPC | 0.3% SURFFINE GL1/SURFDINE SD-6350 (zinc phosphate) | | | |
| Comparative Example 8 | high-tensile steel sheet | 0.3% SURFFINE GL1/SURFDINE SD-6350 (zinc phosphate) | | | |

| | Reaction Conditions (additive mass ratio) | Other Additives (ppm) | Treatment Time (sec) | Notes |
|---|---|---|---|---|
| Comparative Example 1 | — | — | 60 | Zr only |
| Comparative Example 2 | — | Mg nitrate (200) | 60 | Zr + added metal |
| Comparative Example 3 | — | Na nitrite (2000) | 60 | Zr + oxidizing agent |
| Comparative Example 4 | — | KBM903 (200) | 60 | Zr + aminosilane monomer |
| Comparative Example 5 | — | amine modified phenolic resin (200) | 60 | Zr + adhesive resin |
| Comparative Example 6 | — | — | 60 | Zr + PAA |
| Comparative Example 7 | 0.3% SURFFINE GL1/SURFDINE SD-6350 (zinc phosphate) | | 120 | zinc phosphate |
| Comparative Example 8 | 0.3% SURFFINE GL1/SURFDINE SD-6350 (zinc phosphate) | | 120 | zinc phosphate |

| | Sludge External Appearance | Amine Group Amount (mmol/g) | Amount of SPC Coating Film (mg/m²) Zr | Si | C | N/Zr mass ratio | SDT Detached Width (mm) Surface | Edge | CCT (mm) |
|---|---|---|---|---|---|---|---|---|---|
| Comparative Example 1 | b | 10.3 | 38 | — | — | not measured | 7.6 | 7.8 | 9.4 |
| Comparative Example 2 | b | — | 48 | — | — | not measured | 5.8 | 5.6 | 11.2 |
| Comparative Example 3 | b | — | 42 | — | — | not measured | 5.9 | 5.9 | 10.6 |
| Comparative Example 4 | b | 4.5 | 38 | 1.1 | 1.3 | not measured | 5.2 | 5.1 | 9.6 |
| Comparative Example 5 | c | — | 35 | — | 5.2 | not measured | 7.1 | 6.4 | 13.6 |
| Comparative Example 6 | b | 17.5 | 52 | — | 13.0 | not measured | 8.2 | 8.5 | 12.8 |
| Comparative Example 7 | d | 10.3 | 1.6 g/m² | | | not measured | 2.5 | 2.1 | 11.6 |
| Comparative Example 8 | d | 10.3 | 1.7 g/m² | | | not measured | 3.9 | 4.2 | 8.9 |

Cyclic Corrosion Test (CCT)

The test plates obtained in the Examples and Comparative Examples were sealed at their edges and back surface with a tape, and scratched with a cross cut pattern (scratch extending to the base metal) using a cutter, and subjected to a CCT test under the following conditions. The results are shown in Tables 1 and 2.

CCT Test Conditions

The test plates were sprayed with a 5% NaCl aqueous solution warmed to 35° C. for 2 consecutive hours in a salt spray tester kept at a temperature of 35° C. and a humidity of 95%. Next, they were dried for 4 hours under conditions having a temperature of 60° C. and a humidity of 20 to 30%, followed by standing for 2 hours under wet conditions having a temperature of 50° C. and a humidity of 95% or more. After repeating the cycle 200 times, the swelling width of the coating film was measured.

Sludge Observation

Chemical conversion treatment was conducted in the Examples and Comparative Examples, and after standing for 30 days at room temperature, turbidity in the chemical conversion treatment agent (generation of sludge) was compared by visual observation, and the workability was evaluated by the following criteria. The results are shown in Tables 1 and 2.

a: Transparent liquid.

b: Slightly clouded.

c: Clouded.

d: Precipitate (sludge) generated.

As shown in Table 1 and Table 2, it was understood that for the Examples where the specified polyamine compound was added, the detachment of the coating was remarkably lower than for the Comparative Examples where the polyamine compound was not added, and the amount of coating film is greater. Accordingly, by adding a polyamine compound with a specified content of included primary and/or secondary amino groups, it is possible to obtain sufficient base metal concealing properties and coating film adhesiveness, and it is also possible to prevent corrosion.

Industrial Applicability

The metal material treated by the metal surface treatment method of the invention has sufficient base metal concealing properties, coating film adhesiveness, and corrosion resistance. Therefore, it is preferably used for applications followed by coating treatment, such as an automobile body before coating, body shell of a two-wheel vehicle or the like, various parts, the outer surface of a container, and coil coating.

The invention claimed is:

1. A metal surface treatment composition used for surface treatment of a metal, containing
   at least one selected from the group consisting a zirconium compound and titanium compound, and
   a polyamine compound having a number average molecular weight from 150 to 500,000, wherein
   said polyamine compound contains from 0.1 mmol to 17 mmol of at least one selected from the group consisting primary and secondary amino group per 1 g of solid content,
   a content of at least one selected from the group consisting said zirconium compound and titanium compound in said metal surface treatment composition is from 10 ppm to 10,000 ppm with respect to the metal element,
   a mass ratio of at least one selected from the group consisting zirconium element and titanium element included in at least one selected from the group consisting said zirconium compound and titanium compound is from 0.1 to 100, with respect to said polyamine compound, and
   said polyamine compound is a compound having at least one constituent unit shown by the following Formula (3):

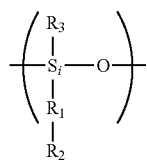

wherein $R_1$ is an alkylene group having a carbon number of 1 to 6, $R_2$ is a substituent shown b the following Formulas (4) to (6), $R_3$ is —OH, —OR$_4$ or —R$_5$ ($R_4$ and $R_5$ are alkyl groups having a carbon number of 1 to 6)

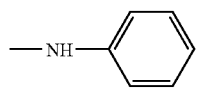

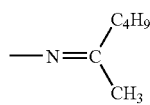

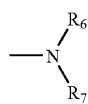

wherein $R_6$ is a hydrogen atom, aminoalkyl group having a carbon number of 1 to 6, or an alkyl group having a carbon number of 1 to 6 $R_7$ is a hydrogen atom, or an aminoalkyl group having a carbon number of 1 to 6.

2. The metal surface treatment composition according to claim 1, wherein said polyamine compound is a product produced by a reaction of at least one selected from the group consisting a primary and secondary amino group-containing compound, and an amine activity reducing compound A having a functional group A having reactivity with at least one selected from the group consisting said primary and secondary amino group.

3. The metal surface treatment composition according to claim 2, wherein said product is produced by a reaction of from 1 mmol to 60 mmol of said functional group A with respect to 100 mmol of at least one selected from the group consisting said primary and secondary amino group.

4. The metal surface treatment composition according to claim 2, wherein said functional group A is at least one kind selected from the group consisting of glycidyl group, isocyanate group, aldehyde group, and acid anhydride group.

5. The metal surface treatment composition according to claim 1, wherein the metal surface treatment composition has a pH from 1.5 to 6.5.

6. The metal surface treatment composition according to claim 1, further containing a fluorine compound, the content of free fluorine element in the metal surface treatment composition being from 0.01 ppm to 100 ppm.

7. The metal surface treatment composition according to claim 1, further containing at least one oxidizing agent selected from the group consisting of nitric acid, nitrous acid, sulfuric acid, sulfurous acid, persulfuric acid, phosphoric acid, carboxylic acid group-containing compound, sulfonic acid group-containing compound, hydrochloric acid, bromic acid, chloric acid, hydrogen peroxide, $HMnO_4$, $HVO_3$, $H_2WO_4$, $H_2MoO_4$, and salts thereof.

8. The metal surface treatment composition according to claim 1, further containing at least one metal element selected from the group consisting of magnesium, zinc, calcium, aluminum, gallium, indium, copper, iron, manganese, nickel, cobalt, cerium, strontium, rare earth elements, and silver.

9. The metal surface treatment composition according to claim 1, further containing at least one surfactant selected from the group consisting of nonionic surfactants, anionic surfactants, cationic surfactants, and ampholytic surfactants.

10. A metal surface treatment composition used for surface treatment of a metal, containing
    at least one selected from the group consisting a zirconium compound and titanium compound, and
    a polyamine compound having a number average molecular weight from 150 to 500,000, wherein
    said polyamine compound is a product produced by interaction of at least one selected from the group consisting a primary and secondary amino group-containing compound, and an amine activity reducing compound B containing at least one functional group B which interacts with at least one selected from the group consisting said primary and secondary amino group and reduces amine activity,
    a content of at least one selected from the group consisting said zirconium compound and titanium compound in said metal surface treatment composition is from 10 ppm to 10,000 ppm with respect to the metal element,
    a mass ratio of at least one selected from the group consisting zirconium element and titanium element included in at least one selected from the group consisting said zirconium compound and titanium compound is from 0.1 to 100, with respect to said polyamine compound, and said polyamine compound is a compound having at least one constituent unit shown by the following Formula (3):

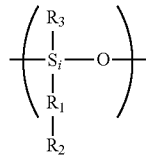

(3)

wherein $R_1$ is an alkylene group having a carbon number of 1 to 6, $R_2$ is a substituent shown by the following Formulas (4) to (6), $R_3$ is —OH —$OR_4$ or —$R_5$ ($R_4$ and $R_5$ are alkyl groups having a carbon number of 1 to 6):

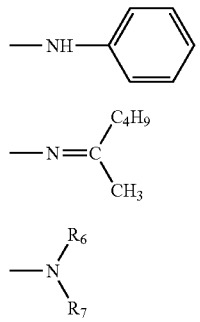

(4)

(5)

(6)

wherein $R_6$ is a hydrogen atom, aminoalkyl group having a carbon number of 1 to 6, or an alkyl group having a carbon number of 1 to 6, $R_7$ is a hydrogen atom, or an aminoalkyl croup having a carbon number of 1 to 6.

11. The metal surface treatment composition according to claim 10, wherein said product is produced by interaction of from 1 mmol to 60 mmol of said functional group B with respect to 100 mmol of at least one selected from the group consisting said primary and secondary amino group.

12. The metal surface treatment composition according to claim 10, wherein said functional group B is at least one kind selected from the group consisting of carboxyl group, sulphonic group, phosphate group, silanol group, and phosphorous group.

13. The metal surface treatment composition according to claim 10, wherein the metal surface treatment composition has a pH from 1.5 to 6.5.

14. The metal surface treatment composition according to claim 10, further containing a fluorine compound, the content of free fluorine element in the metal surface treatment composition being from 0.01 ppm to 100 ppm.

15. The metal surface treatment composition according to claim 10, further containing at least one oxidizing agent selected from the group consisting of nitric acid, nitrous acid, sulfuric acid, sulfurous acid, persulfuric acid, phosphoric acid, carboxylic acid group-containing compound, sulfonic acid group-containing compound, hydrochloric acid, bromic acid, chioric acid, hydrogen peroxide, $HMnO_4$, $HVO_3$, $H_2WO_4$, $H_2MoO_4$, and salts thereof.

16. The metal surface treatment composition according to claim 10, further containing at least one metal element selected from the group consisting of magnesium, zinc, calcium, aluminum, gallium, indium, copper, iron, manganese, nickel, cobalt, cerium, strontium, rare earth elements, and silver.

17. The metal surface treatment composition according to claim 10, further containing at least one surfactant selected from the group consisting of nonionic surfactants, anionic surfactants, cationic surfactants, and ampholytic surfactants.

* * * * *